Sept. 14, 1954     M. J. CARPINELLA     2,688,785
WIRE SPRING TYPE SNAP FASTENER SOCKET
Filed July 26, 1952
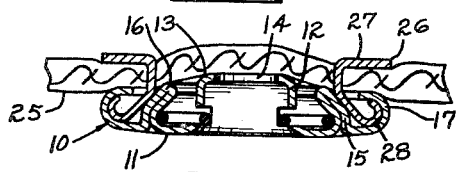
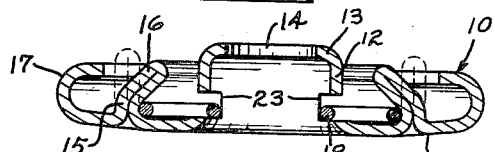
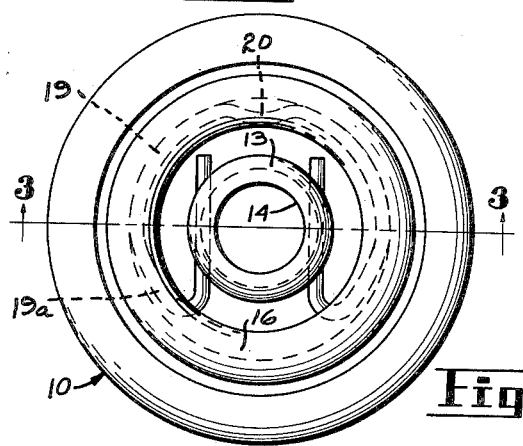
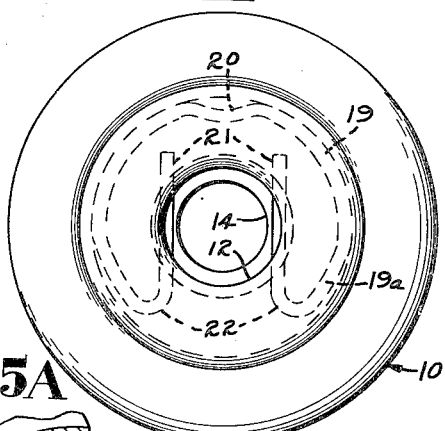
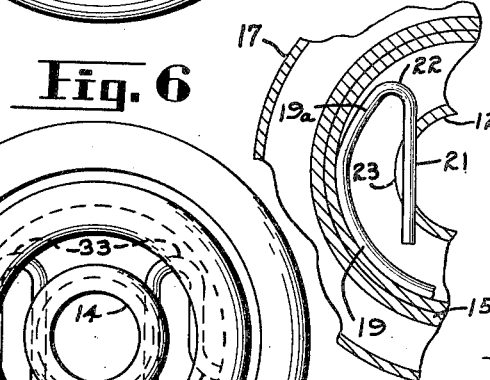
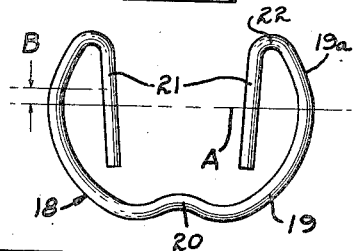
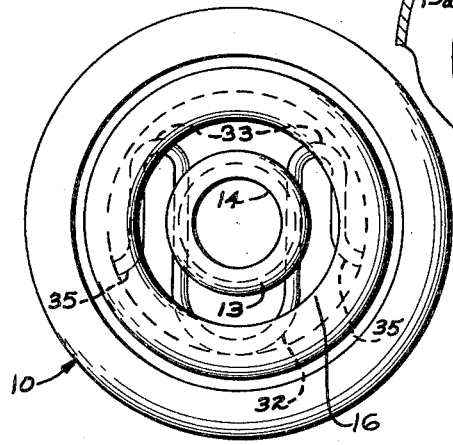
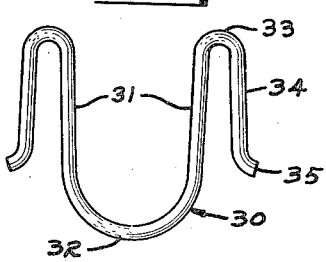
INVENTOR
Michael J. Carpinella
BY H. F. Johnston
ATTORNEY Patented Sept. 14, 1954

2,688,785

UNITED STATES PATENT OFFICE 2,688,785

WIRE SPRING TYPE SNAP FASTENER SOCKET

Michael J. Carpinella, Waterbury, Conn., assignor to Scovill Manufacturing Company, Waterbury, Conn., a corporation of Connecticut Application July 26, 1952, Serial No. 301,115

3 Claims. (Cl. 24—218)

This invention relates to snap fastener sockets and particularly to that type of socket employing a spring wire element of the parallel arm type.

Snap fastener sockets employing spring wire elements of the parallel arm or jaw type are very desirable for many purposes because of the very reliable and uniformly easy snapping action. Heretofore, fasteners of this type have been attached usually by stitching. Other attempts at attaching such sockets by the use of eyelets have involved additional parts or other complications.

The principal object of this invention, therefore, is to provide an improved construction of the socket housing member which will enable it to be attached by a prong ring which is commonly used for attaching other types of snap fastener sockets. According to my information this is accomplished by means of an intermediate rib extending from the base and inclined inwardly so that this rib not only serves to confine the spring member but also provides an inclined deflecting surface for cooperation with the prongs of the prong ring for the purpose of upsetting and interlocking the prongs with the socket during the setting operation.

Other objects and advantages of the invention will be evident from the description which follows and from the drawing, in which Fig. 1 is a cross sectional view through the socket member embodying the invention showing it assembled to a flexible support by a prong ring attaching member.

Fig. 2 is a top plan view of the socket member, per se, on a larger scale than Fig. 1.

Fig. 3 is a cross sectional view of the socket member taken along the line 3—3 of Fig. 2.

Fig. 4 is a bottom plan view of the socket member.

Fig. 5 is a plan view of the spring wire element as it appears before assembly into the socket member.

Fig. 5A is a sectional view of a longitudinal plane of a portion of the socket member showing how the spring element is assembled.

Fig. 6 is a top plan view of the socket member showing a modified form of spring embodied therein, and Fig. 7 is a plan view of the spring as it appears before assembly into the socket of Fig. 6.

Referring to the drawing, the numeral 10 designates generally a socket housing formed of sheet metal providing a substantially flat base 11, and an integral centrally formed hollow hub 12 terminating at its upper end in a rounded domed end 13 surrounding a central aperture 14.

Extending upwardly from an intermediate portion of the base is an annular rib 15 formed by a double fold of the sheet material initially forming a part of the base 11. The rib 15 is concentric and spaced from the hub section 12 and initially stands in an upright position as shown in dotted outline in Fig. 3, a portion of which is later biased inwardly to provide an inclined section 16 that serves as a deflector anvil for reasons as will appear later.

The outer end of the base 11 is curled upwardly and inwardly to produce a peripheral clincher rim 17.

The preferred form of spring 18 for assembly into the socket housing is disclosed in Fig. 5 and consists of a pair of arcuate sections 19 joined together by a reentrant angle 20. It is to be noted from Figs. 5 and 5A that the arcuate sections 19 are formed on a radius conformable to the radius of the inner wall of the socket rib 15. The lengths of the arcuate sections 19 extend from their point of connection with the reentrant angle 20 to a short distance beyond the constructional center line indicated by the letter "A" and this distance as indicated by the dimensional lines "B" may be of the order of $\frac{1}{16}$" or more for reasons as will appear later. Beyond the dimensional line "B" other arcuate sections 19a are formed which may be of a different radius than sections 19 or the same radius but struck from a different center, these sections 19a being formed inwardly relative to normal continuations of sections 19. The sections 19a are joined to stud-engaging straight arm sections or jaws 21 through loop bends 22. As shown in Fig. 5 the spring wire 18 in its normal state before assembly is so formed that the arcuate sections 19 are set outwardly beyond the radius of the inner wall of the rib 16 and thus disposing the straight arms in a slight converging position. The reentrant angle 20 serves to set the spring and give that portion of the spring a lesser degree of resiliency and assure a firmer grip with the socket housing 10 when the spring is there assembled in place.

In assembling the spring 18 into the socket housing the arcuate sections 19 will be compressed inwardly to fit against the inner wall of the annular rib 15 in its initial upright state and then forced downwardly about the hub 12. During this operation the straight arms 21 will cam over the domed end 13 of the hub 12 riding over the wall of the hub 12 to a position where the arms will snap into a pair of opposite slots 23 provided in said hub adjacent the base 11. When the arms 21 are disposed in the slots 23 they will be held in parallel relationship and adapted to have freedom of movement for snap engagement over the head of a stud member. After this spring is assembled the upstanding portion of the rib section 15 will be bent inwardly to form the inclined section 16 to permanently hold the spring 18 in the socket housing. It is to be noted from Fig. 5A that when the spring 18 is assembled into the socket housing 10 the arcuate sections 19a will be slightly relieved or spaced from the inner wall of the rib 18 so that that portion of the spring will be permitted to flex along with the straight arms 21 and thus permit a greater degree of resiliency for said straight arms and conducive to produce a lighter and more uniform snap action of the socket relative to a stud member to which it may be attached.

In assembling the socket to a piece of fabric 25 or similar supporting material an attaching prong ring 26 of well known construction is provided having a substantially flat annulus 27 disposed against one surface of the fabric 25 and a plurality of prongs 28 pierced through said fabric as shown in Fig. 1. In forcing the prong ring 26 and socket housing 10 together by suitable setting tools the prongs 28 will be aligned with the inclined section or deflector anvil 16 and biased outwardly to engage in the clincher rim 17 where they will be curled or otherwise upset to permanently secure the socket to the support.

It is to be noted that by reason of the particular construction of the rib 15 and inclined section 16 the spring 18 is confined entirely within a protected area and the prongs 26 of the prong ring are disposed entirely on the opposite side of the rib in a position where there is no possibility of the prongs interfering with the action of the spring 18.

In Figs. 6 and 7 a modified form of spring structure 30 is disclosed. The housing 10 is identical in all respects to that described above. The spring 30 in this form consists of a pair of straight stud-engaging arms or jaws joined together at one end by a U-shaped bend 32.

The opposite ends of the arms 31 are connected to hairpin loops 33 and they in turn support straight arms 34 terminating in outwardly formed hooked ends 35. This modified spring 30 may be assembled into the socket housing in the same manner as that described for the first form of spring shown in Fig. 5.

It will be noted from Fig. 7 that the U-shaped bend 32 of the modified spring 30 is initially shaped to hold the straight arms in a slightly converging position. When the spring 30 is assembled into the socket housing 10 the straight arm 31 will be held in parallel relationship in the slots 23 of the hub 12 and the hairpin loops 33, outer straight arms 34 and hooked ends 35 will be confined in the space defined by the rib 15 and inclined section 16. It is to be noted from Fig. 6 that it is only the hooked ends 35 of the spring 30 that bear against the inner wall of the rib 15 while the hairpin loops 33 are spaced slightly therefrom to allow freedom of movement.

It is, of course, obvious that minor changes in details of construction and arrangement of parts may be made without departing from the scope of the present invention as set forth in the appended claims.

I claim:

1. A snap fastener socket member comprising a housing having a base portion, an upwardly projecting central hub, a curled clincher rim on the outer periphery of said base, and a rib projecting upwardly from the base and spaced radially outwardly from said hub portion, said rib sloping inwardly toward said hub to provide a prong deflecting surface, said hub having a pair of opposed slots adjacent the base, and a wire spring having parallel arms freely movable within said slots, said wire spring having other portions including a connection for said parallel arms bearing against said rib.

2. A snap fastener socket member comprising a housing having a base portion, an upwardly projecting central hub, a curled clincher rim on the outer periphery of said base, and a rib projecting upwardly from an intermediate portion of the base and having a biased portion directed inwardly toward said hub to provide a deflector anvil, said hub having a pair of opposed slots adjacent the base, and a wire spring element having a pair of opposed arcuate sections joined together at one end and supporting straight arms at their opposite ends, said straight arms being laterally movable within said slots, said spring element being held in said housing by said rib, said arcuate sections pressing against said rib underneath said biased portion.

3. A snap fastener socket member as defined in claim 1 which, except for the spring, is a single piece of sheet metal and wherein the rib is a double thickness fold formed upwardly out of the base.

References Cited in the file of this patent

UNITED STATES PATENTS

| Number | Name | Date |
|---|---|---|
| 1,283,245 | Mackenzie et al. | Oct. 29, 1918 |
| 1,439,327 | Puc | Dec. 19, 1922 |
| 1,801,221 | Carr | Apr. 14, 1931 |
| 2,332,167 | Reiter | Oct. 19, 1943 |